US012131669B2

(12) United States Patent
Jarczyk et al.

(10) Patent No.: US 12,131,669 B2
(45) Date of Patent: Oct. 29, 2024

(54) METHOD FOR PRODUCING A LABEL AND CORRESPONDING LABEL

(71) Applicant: Airbus Operations GmbH, Hamburg (DE)

(72) Inventors: Robert Jarczyk, Hamburg (DE); Michael Telkamp, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 24 days.

(21) Appl. No.: 17/871,571

(22) Filed: Jul. 22, 2022

(65) Prior Publication Data

US 2023/0034989 A1 Feb. 2, 2023

(30) Foreign Application Priority Data

Jul. 29, 2021 (EP) .................................... 21188402

(51) Int. Cl.
*G09F 3/10* (2006.01)
*G09F 3/02* (2006.01)

(52) U.S. Cl.
CPC .................. *G09F 3/10* (2013.01); *G09F 3/02* (2013.01); *G09F 2003/0202* (2013.01); *G09F 2003/0257* (2013.01)

(58) Field of Classification Search
CPC ............... G09F 3/10; G09F 2003/0202; G09F 2003/021; G09F 2003/0257; G09F 2003/0264; G09F 2007/127; G09F 2007/1865; G09F 21/048; G09F 21/049; G09F 21/06; G09F 21/08; G09F 3/02; Y10S 428/906; Y10S 428/914; Y10T 428/14; Y10T 428/2813; C09J 7/22; C09J 7/30; C09J 2301/1242
See application file for complete search history.

(56) References Cited

U.S. PATENT DOCUMENTS

| | | | | | |
|---|---|---|---|---|---|
| 3,351,515 | A | * | 11/1967 | Muttera, Jr. | G09F 3/10 428/40.1 |
| 4,977,006 | A | * | 12/1990 | Smith | G09F 3/02 156/247 |
| 5,290,067 | A | | 3/1994 | Langen | |
| 2007/0036929 | A1 | | 2/2007 | Baird et al. | |
| 2019/0218424 | A1 | | 7/2019 | Suito et al. | |
| 2023/0034989 | A1 | * | 2/2023 | Jarczyk | G09F 3/02 |

FOREIGN PATENT DOCUMENTS

| | | |
|---|---|---|
| KR | 20110002595 U | 3/2011 |

OTHER PUBLICATIONS

English translation of written opinion for EP21188402.8.*
European Search Report; priority document.

* cited by examiner

*Primary Examiner* — Sonya M Sengupta
(74) *Attorney, Agent, or Firm* — Greer, Burns & Crain, Ltd.

(57) ABSTRACT

A method for producing a label for affixing in a vehicle. The method includes printing of a substrate layer to yield a basic label form; production of an adhesive film with a first adhesive layer; and sticking the adhesive film to the basic label form using a second adhesive layer to produce the label. Also described is a label kit including a basic label form with a printed substrate layer and an adhesive film, wherein the adhesive film is configured to be stuck to a printed side of the substrate layer of the basic label form.

8 Claims, 4 Drawing Sheets

METHOD FOR PRODUCING A LABEL AND CORRESPONDING LABEL

CROSS-REFERENCES TO RELATED APPLICATIONS

This application claims the benefit of the European patent application No. 21188402.8 filed on Jul. 29, 2021, the entire disclosures of which are incorporated herein by way of reference.

FIELD OF THE INVENTION

The present invention relates to a method for producing a label for affixing in or to a vehicle, and to a label kit. In particular, the present invention relates to a method for producing a label consisting of a basic label form and an adhesive film, and to a label kit comprising these elements.

BACKGROUND OF THE INVENTION

Labels or stickers for identifying vehicles or vehicle elements generally consist of a substrate layer onto which the identifier is printed, and which is provided with an adhesive layer. However, conventional adhesives for such an adhesive layer have a limited shelf life, which limits the extent to which the labels and stickers can be stored.

SUMMARY OF THE INVENTION

The present invention addresses the problem of applying a sticker to a vehicle in a simple manner, and of providing a corresponding method for producing a sticker, and such a sticker.

According to a first aspect, for better understanding of the present disclosure, a method for producing a label for affixing in or to a vehicle comprises the steps of printing a substrate layer to yield a basic label form, producing an adhesive film with a first adhesive layer, and sticking the adhesive film to the basic label form using a second adhesive layer to produce the label.

Producing the basic label form and the adhesive film separately means that these processes can be carried out at different times. Thus, the adhesive film can be produced shortly before the actual use of the label, and stuck onto the basic label form. By contrast, a conventional label with a usual adhesive film can be stored for at most 12 or 18 months, after which it cannot be used since the adhesive that is used loses its properties. Thus, in the case of conventional labels and stickers, the label and the sticker must be destroyed after this storage time.

In particular in aeronautical engineering, labels have to meet specific requirements. For example, labels and markings affixed to the exterior of the aircraft are exposed to high flow velocities and highly variable weather effects (both temperature effects and humidity), and labels and markings affixed to the interior of the aircraft must not be flammable and must not produce significant smoke when subjected to high temperatures. For that reason, the adhesives used in this field are special adhesives and generally have a short shelf life (in general less than 18 months).

In the case of the method disclosed here, the adhesive film can, for example, be produced and provided a few days (1 to 5 days), a few weeks (1 to 10 weeks) or even a few months (1 to 6 months) prior to the label being affixed in or on the vehicle. This production of the adhesive film independently of the production of the (visible) part of the label, the basic label form, significantly increases the extent to which the label as a whole can be stored. Thus, the basic label form can be stored for significantly longer than usual adhesives or usual labels having such an adhesive.

Furthermore, producing a basic label form and an adhesive film separately means that these processes can be carried out at different locations. Thus, the basic label form can, for example, be produced (printed) close to or at the location where the label is to be applied on or in the vehicle, while the adhesive film can be delivered. Of course, the production locations of the two components can be reversed.

Both options permit flexible production of a label, making it possible to change the pattern and/or text when printing the basic label form. In particular, the pattern and/or the text can be updated, adapted and printed shortly prior to application in or on the vehicle. Thus, the pattern and/or text of the basic label form can be adapted in a user-specific manner, to the respective user of the label or user of the vehicle in or on which the label is affixed.

The labels in question here can, in particular, be identifiers in or on a vehicle. These are, for example, identification of the vehicle, of the vehicle type, of the vehicle operator (in particular, in the case of a label, affixed externally or internally to the vehicle), as well as information, warnings, explanations and/or advertisements (in particular, in the case of a label affixed to the interior of a vehicle). Thus, the vehicle may be an aircraft, a bus, a train, a ship, a truck or a passenger car.

In one implementation variant, the method can further comprise storage of the basic label form. Since the basic label form is produced without adhesive, it can generally be stored without any problems, in particular, for a longer storage period than is possible with commonly used adhesives (that is to say, longer than 18 months).

The basic label form may, in particular, be stored prior to production of the adhesive film. This highlights the temporal and/or spatial separation of the production, of the basic label form and of the adhesive film, that is made possible thereby. The latter can be produced or delivered once the basic label form has been retrieved from storage, in order to then (promptly) affix the label to or in the vehicle.

In another implementation variant, the method can include sticking the label to the vehicle or to an element of the vehicle, using the first adhesive layer of the adhesive film. The first adhesive layer can be the same adhesive as in the second adhesive layer.

Alternatively, it is also possible to use different adhesives for the first adhesive layer and for the second adhesive layer. This permits optimal use of, on one hand, adhesive material for securing the basic label form to the adhesive film (second adhesive layer) and, on the other hand, adhesive material optimized for the surface and/or material of the vehicle or vehicle element to which the first adhesive layer has to adhere.

In a further implementation variant, the production of the adhesive film can involve applying the first adhesive layer to a substrate layer. The substrate layer can be designed with the adhesive of the first and/or second adhesive layer in mind, so that the substrate layer is not chemically altered by the adhesive of the first and/or second adhesive layer.

Alternatively, the production of the adhesive film can also involve the production of a two-sided adhesive film, the two-sided adhesive film having a first adhesive layer and the second adhesive layer on a substrate layer. In that context, the first and second adhesive layers are applied to opposite sides of the substrate layer.

In yet another implementation variant, the substrate layer of the two-sided adhesive film can be opaque. For example, the substrate layer can be white and non-transparent. Furthermore, the substrate layer can be designed to provide a background for the printing of the basic label form. Thus, the substrate layer can have a color which contrasts well with the printing color(s) used when printing the basic label form.

Alternatively or additionally, the substrate layer of the adhesive film may also itself be printed, at least partially colored, or contain color pigments which form a background pattern for the printing of the basic label form. This makes it possible to form the ultimate visible pattern and/or text when the basic label form and the adhesive film are joined together.

Also alternatively or additionally, the substrate layer of the adhesive film can be transparent. This makes it possible to use the color of the surface of the vehicle or vehicle element as a background color for the printing of the basic label form. A transparent substrate layer for the adhesive film also makes it possible to use the label on a light-emitting section of the aircraft or aircraft element, so that the printing of the basic label form can be highlighted by means of a (switchable) illumination unit, thus making it either visible or invisible.

In another implementation variant, the first adhesive layer and/or the second adhesive layer of the adhesive film may be transparent. A transparent second adhesive layer makes it possible to keep the substrate layer of the adhesive film visible from the side of the basic label form. Thus, the printing of the basic label form with the substrate layer of the adhesive film can be viewed together, and the latter forms the background for the printing of the basic label form.

In yet another implementation variant, the substrate layer of the basic label form can be transparent. This also makes it possible to see through the basic label form (at those points which are free from printing), for example to the substrate layer of the adhesive film and/or to the surface of the vehicle or vehicle elements to which the label is affixed. This also makes it possible to shine through the entire label for optical activation.

In any case, a visible (non-transparent) substrate layer of the adhesive film, together with the printing of the basic label form, can form the visible part of the label. Thus, the substrate layer of the adhesive film can form a background and, in some ways, also the substrate layer for the printing of the basic label form, which in the case of conventional labels is generally printed together onto a substrate of the conventional label. In the case of the method provided here, the basic label form can be retained in general, for example a specific text and/or a specific pattern can be printed onto the substrate layer of the basic label form, while the background in the form of the substrate layer of the adhesive film can be adapted to the respective use location, in particular to the respective vehicle. Thus, the same basic label form can be used, for example, for various vehicles, vehicle types of vehicle operators, while only the adhesive film is adapted to the corresponding vehicle, vehicle type or vehicle operator. In particular, in the case of differently-colored vehicle interiors of different vehicle operators, this makes it easy to adapt the background of the label to this coloration. This can even be done shortly prior to application of the label, meaning that in the event of changes on the vehicle operator side no previously manufactured labels need be destroyed.

In a further implementation variant, the printing can include an inkjet printing process. An inkjet printing process is cost-effective to implement and can be carried out at almost any location. By contrast, production of the two-sided adhesive film with the often specialized adhesives can be performed at different times in different places in specialized production plants.

Furthermore, the method according to the first aspect makes it possible to dispense with a method step that is common in conventional labels. In particular, in conventional labels the background is applied by screen printing. This is not only time-consuming but also cost-intensive, since it is necessary to keep corresponding machines available.

In the present disclosure, it is possible to dispense with screen-printing since the background of the label is provided, for example, by the adhesive film.

According to a second aspect for better understanding the present disclosure, a label kit comprises a basic label form which comprises a printed substrate layer, and an adhesive film which comprises a substrate layer and a first adhesive layer. In that context, the adhesive film designed to be stuck to a printed side of the substrate layer of the basic label form.

This makes it possible to put together the resulting label (i.e., sticking together the basic label form and the adhesive film) when required, that is to say, when the label is stuck on. This makes it possible to produce (and also store) the basic label form and the adhesive film at different locations and/or different times.

Sticking together the basic label form and the adhesive film can be done, for example, by spraying a second adhesive layer onto the basic label form and/or the adhesive film, and subsequently bringing together the basic label form and the adhesive film. Alternatively or in addition, a second adhesive layer can be affixed thereto already during production of the adhesive film, by means of which second adhesive layer the adhesive film can be affixed to the basic label form.

In one implementation variant, the basic label form, in particular its substrate layer, can be made of a polymer material such as polycarbonate, polymethyl methacrylate, polyvinyl chloride or polyphenylene sulphide. Alternatively, the basic label form, in particular its substrate layer, can be made of glass or a metallic material, for example aluminum. The first and/or second adhesive layer can consist of pressure-sensitive adhesives such as acrylates or elastomers, for example natural rubber, butyl, ethylene-vinyl acetate, nitrile, styrene block copolymers or silicones. Alternatively, it is also possible to use reaction adhesives, such as polyurethane, epoxies or acrylates, for the first and/or second adhesive layer.

In another implementation variant, the substrate layer of the adhesive film can be white and non-transparent. Alternatively, the substrate layer of the adhesive film can be at least partially colored or at least partially printed. Thus, the substrate layer of the two-sided adhesive film can form a background for the printing of the basic label form.

In another implementation variant, the first adhesive layer and/or the second adhesive layer (for sticking the adhesive film onto the basic label form) may be transparent. Alternatively or additionally, the substrate layer of the adhesive film can be transparent.

In yet another implementation variant, the adhesive film may comprise a removable protective film on the first adhesive layer and/or on the second adhesive layer. The protective film serves to avoid activation of the adhesive of the respective adhesive layer, and to avoid the adhesive layer drying out. Accordingly, the protective film of the first adhesive layer is removed shortly prior to application of the (finished) label in or on the vehicle or vehicle element. Accordingly, the protective film of the second adhesive layer is removed shortly prior to bringing together the basic label form and the adhesive film. If the adhesive film is stored and delivered in a rolled-up format, one protective film can suffice.

According to a third aspect, for improving understanding of the present disclosure, a method for applying a sticky label to a vehicle involves printing onto an adhesive layer to yield a label, and sticking the printed adhesive layer to the vehicle.

In this method, the production of the label is greatly simplified, meaning that the application of a sticky label to a vehicle can be carried out rapidly and cost effectively. This makes it possible to print onto an adhesive film or an adhesive layer, for example using an inkjet printer, the adhesive film or the adhesive layer being designed to adhere to the vehicle or a vehicle element. This makes it possible to dispense with substrate layers and specially prepared background layers. On one hand, the vehicle or the vehicle element can serve as the background, in particular if the adhesive film or the adhesive layer is transparent. On the other hand, the adhesive film or the adhesive layer can be at least partially colored, whereby the adhesive film or the adhesive layer forms the colored background.

The embodiments, variants and aspects described here may be combined in any desired manner, such that further embodiment variants that are not explicitly described are encompassed. The implementation variants described here, also of different aspects, may be combined with one another as desired, or combined with already-combined implementation variants, or even combined between the three aspects.

BRIEF DESCRIPTION OF THE DRAWINGS

Exemplary embodiments of the invention will be described in more detail below on the basis of the drawings.

DETAILED DESCRIPTION OF THE PREFERRED EMBODIMENTS

The present invention describes a method for producing a label, a label kit and a method for applying a sticker to a vehicle.

Figure 1:
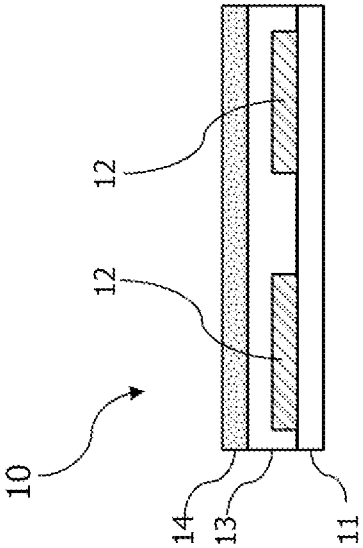
FIG. 1 shows, schematically, a construction of a conventional label.

FIG. 1 shows, schematically, a construction of a conventional label 10. The conventional label 10 comprises, in most cases, a transparent substrate 11, onto which the corresponding pattern and/or text 12 is printed. Subsequently, the background 13 of the label is printed so that the pattern and/or text 12 with the corresponding background 13 are visible from the side of the substrate 11. An adhesive layer 4 is applied to the rear side (that side of the printed background 13 facing away from the substrate 11). This adhesive layer 4 serves for sticking the label to any surface. The printing of the pattern and/or text 12, and the printing of the background 13, are generally done using various printing processes, or require a given drying time after the printing of the pattern and/or text 12.

Figure 2:
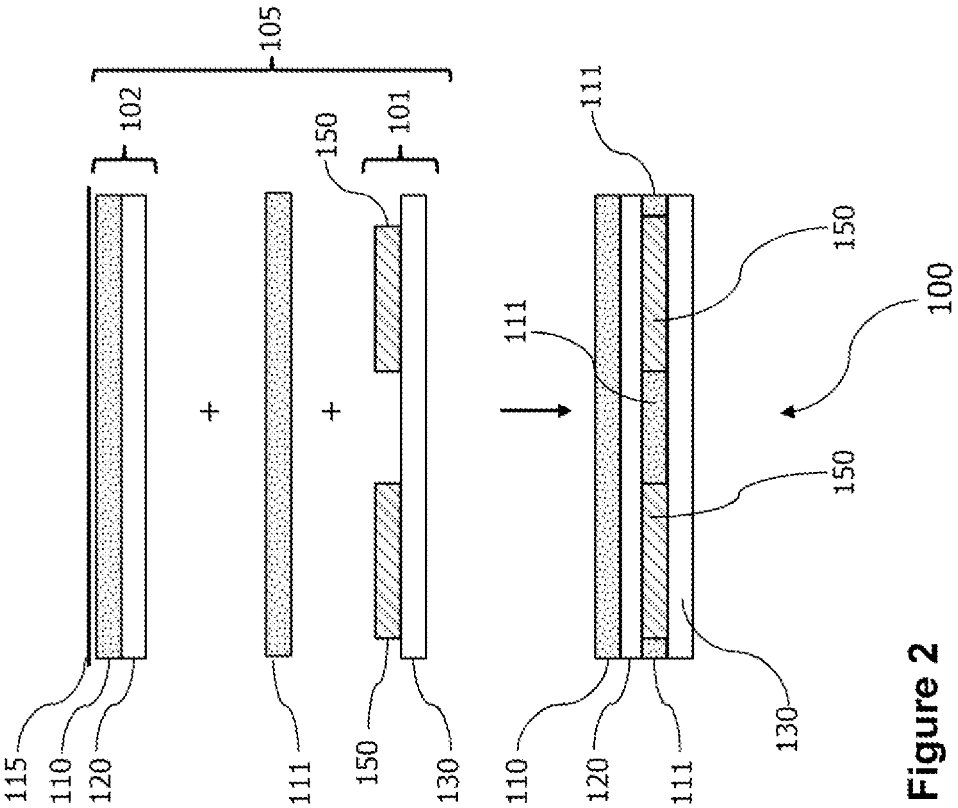
FIG. 2 shows, schematically, a first exemplary construction of a label kit and label according to the present disclosure.

By contrast, FIG. 2 shows, schematically, a construction of a label kit 105, and a resulting label 100 according to the present disclosure. The layer thicknesses depicted in the figures are not to scale, but are merely diagrammatic. In order to be able to distinguish between the individual layers, most layers have been depicted with the same thickness, even though each layer can have a given thickness, which can be equal to or different from the thickness of any other layer.

On one hand, the label kit 105 has a basic label form 101 which comprises a printed substrate layer 130. A pattern and/or text 150 can be applied to the substrate layer 130, for example by means of inkjet printing (or indeed any other printing variant, such as screen printing, thermal printing and the like). The pattern and/or text 150 will subsequently be the visible portion of the label, to which a person's attention is to be drawn. For example, this may be lettering on a vehicle or equally a pictogram, text, a picture, a warning, information or the like which is to be visibly displayed in a vehicle. Thus, for example in the case of an aircraft 1 (FIG. 6), this might be indications for an exit, the path to and exit, the identification of a storage point for certain items of equipment, the identification of a lavatory, and other identifications.

The label kit 105 further comprises an adhesive film 102 which comprises a substrate layer 120. The substrate layer 120 is provided on one side with a first adhesive layer 110. The adhesive film 102 is designed to be applied to a printed side of the substrate layer 130 of the basic label form 101. This may, in particular, take place at a different time from the printing of the substrate layer 130 of the basic label form 101, for example shortly prior to actually sticking the label 100 in or on the vehicle 1.

The adhesive film 102 can be equipped with a protective film 115 which is applied to the first adhesive layer 110 in order to protect the latter. The protective film 115 is removed only when the adhesive film 102 is used, that is to say is stuck in or on the vehicle 1.

The basic label form 101 and the adhesive film 102 are brought together, for example using a second adhesive layer 111. This second adhesive layer 111 can be applied to the printed basic label form 101 and/or the adhesive film 102, when the label 100 is to be completed. This can take place either shortly after the production of the basic label form 101 and the adhesive film 102, or shortly prior to application of the label 100 in or on the vehicle 1.

Purely by way of example, the second adhesive layer 111 can be sprayed onto the basic label form 101, and then the adhesive film 102 applied. In this context, the basic label form 101 and the adhesive film 102 can be pressed together in order to produce a coherent connection, as depicted in the finished label 100 in FIG. 2.

This variant of the label kit 105 permits temporal and spatial separation of the production of the basic label form 101 and of the adhesive film 102. This also makes it possible for the basic label form 101 and the adhesive film 102 to be stored at different locations and at/for different times.

As can be seen from the label 100 in FIG. 2, the substrate layer 120 of the adhesive film 102, together with the pattern and/or text 150 of the basic label form 101, forms the overall pattern of the label 100. For example, in the case of a non-transparent substrate layer 120 of the adhesive film 102, the printing 150 of the basic label form 101 can complement the color of the substrate layer 120. For example, the substrate layer 120 of the adhesive film 102 can have a color that increases the contrast of the pattern and/or the text 150.

Alternatively or in addition, the substrate layer 120 of the adhesive film 102 may also be fluorescent. This makes it possible for the pattern and/or text 150 of the label 100 to be recognizable, even in the absence of lighting. Also alternatively or additionally, the substrate layer 120 of the adhesive film 102 can also be designed in such a way that it complements the printed pattern and/or text 150 of the basic label form 101. This also makes it possible to put in place safety features of the label 100.

Preferably, in order to design the label 100 such that only the printed pattern and/or text 150, together with the substrate layer 120 of the adhesive film 102, are visible, the substrate layer 130 of the basic label form 101 and the second adhesive layer 111 are transparent. Moreover, the substrate layer 120 of the adhesive film 102 can also be transparent in order to make the printed pattern and/or text 150 visible. In this case, the substrate layer 120 of the adhesive film 102 does not serve as a background, but rather the background is the surface to which the label 100 with the first adhesive layer 110 is stuck. To that end, the first adhesive layer 110 should also be transparent.

The label 100 can furthermore have the protective film 115 on the first adhesive layer 110. Once this is removed, the label 100 can be stuck to any surface.

Figure 3:
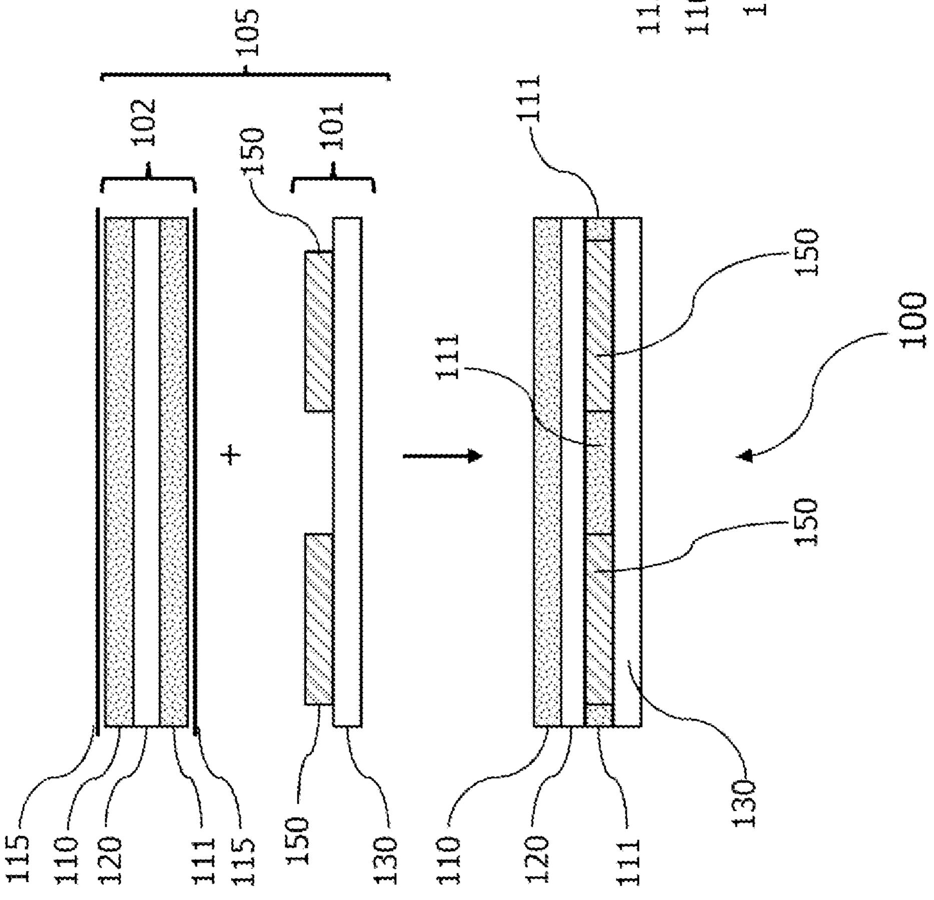
FIG. 3 shows, schematically, a second exemplary construction of a label kit and label according to the present disclosure.

FIG. 3 shows, schematically, a second exemplary construction of a label kit 105 and label 100 according to the present disclosure. The construction of FIG. 3 is very similar to FIG. 2, and for that reason identical components—and their functions—will not be described anew. These identical components are provided with identical reference signs.

In the case of the label 100 of FIG. 3, the label kit 105 comprises a two-sided adhesive film 102 which also comprises a substrate layer 120. Here, the substrate layer 120 is provided—on its two opposite sides—with a first adhesive layer 110 and a second adhesive layer 111. The two-sided adhesive film 102 is designed to be applied, with the second adhesive layer 111, to a printed side of the substrate layer 130 of the basic label form 101. This may in particular take place at a different time from the printing of the substrate layer 130 of the basic label form 101, for example shortly prior to actually sticking the label 100 in or on the vehicle 1.

The adhesive film 102 can be equipped with two protective films 115 which are applied to the first adhesive layer 110 and the second adhesive layer 111 in order to protect the respective adhesive layer. The protective film 115 of the first adhesive layer 110 is removed only when the adhesive film 102 is used, that is to say, is stuck in or on the vehicle 1. Moreover, the protective film 115 on the second adhesive layer 111 can be removed when the adhesive film 102 is applied to the basic label form 101.

Figure 4:
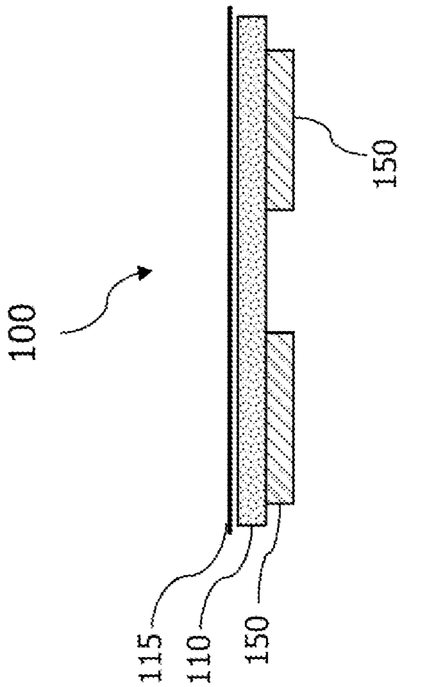
FIG. 4 shows, schematically, a further exemplary construction of a label according to the present disclosure.

FIG. 4 shows, schematically, a further exemplary construction of a label 100 according to the present disclosure. This construction is greatly simplified, and therefore permits rapid production of a label 100. In particular, the label 100 has only a first adhesive layer 110 which is printed with the pattern and/or text 150. This configuration dispenses with any and all substrate layers, and—in comparison with conventional labels—also dispenses with a screen-printing process. Thus, this label 100 can also be printed shortly prior to application in or on the vehicle 1.

A protective film 115 can be applied in order to protect the adhesive layer 110.

In one alternative configuration, which is not depicted separately here, it is also possible for a substrate layer 120 to be provided between the adhesive layer 110 and the pattern and/or text 150. The substrate layer 120 can, for example, then be required if the printing color or ink of the pattern and/or text 150 needs to be chemically separated from the adhesive of the adhesive layer 110.

Figure 5:
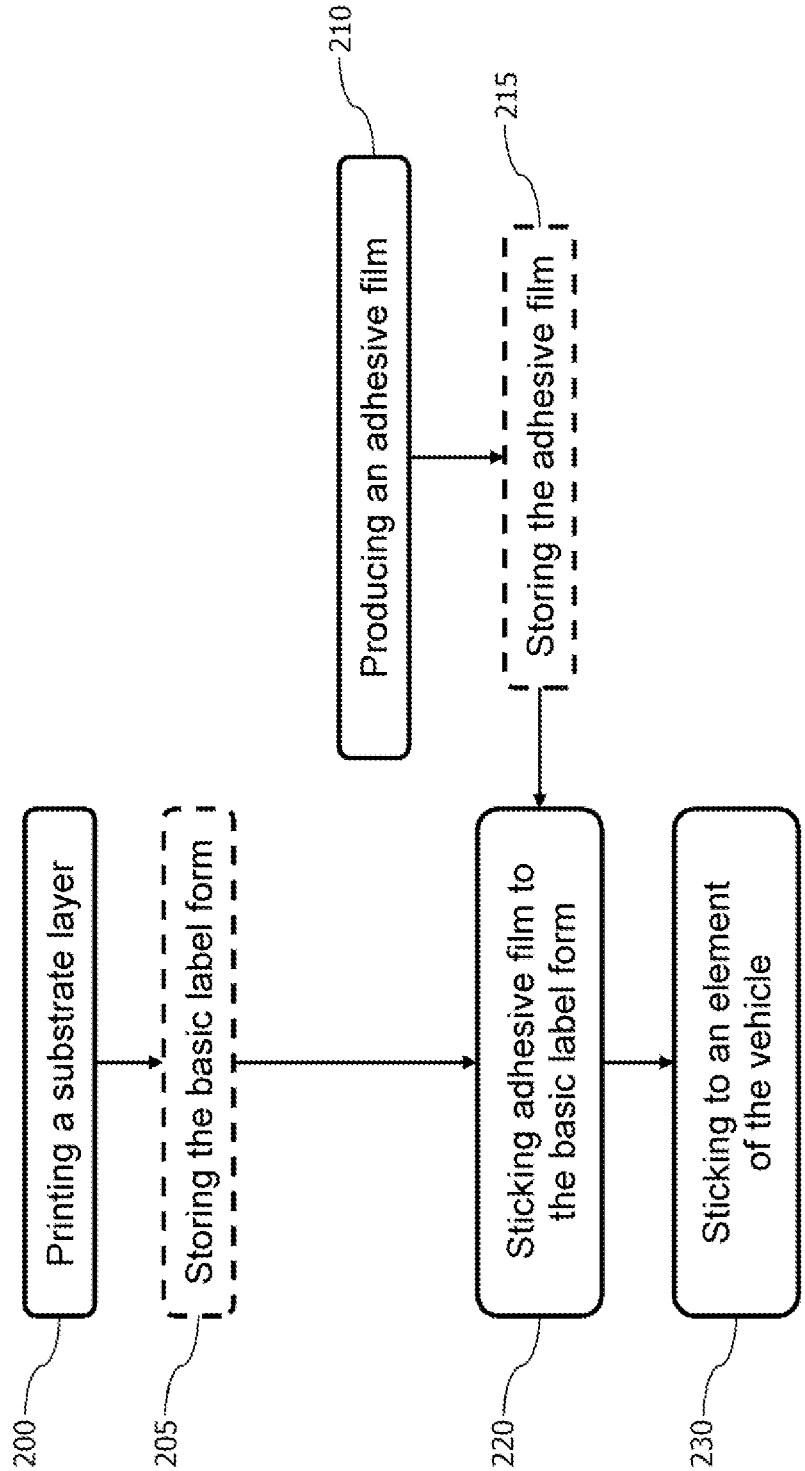
FIG. 5 shows, schematically, an exemplary block diagram of a method for producing a label.

FIG. 5 shows, schematically, an exemplary block diagram of a method for producing a label 100. In that context, the method can begin in step 200 with printing of a substrate layer 130 to yield a basic label form 101. For example, ink forming a pattern and/or text 150 is printed onto the substrate layer 130 of the basic label form 101.

Subsequently, the basic label form 101 can be stored in step 205, should this be necessary.

Temporally (and also spatially, if necessary) independently of steps 200 and 205, a (two-sided) adhesive film 102 can be produced in step 210 of the method. This comprises, in particular, the application of at least a first adhesive layer 110 to a first side of a substrate layer 120 of the adhesive film 102, and optionally the application of a second adhesive layer 111 to a second side of the substrate layer 120 of the adhesive film 102. The first and second sides of the substrate layer 120 of the adhesive film 102 are on opposite sides of the substrate layer 120. In addition, one or more protective films 115 can be applied to the respective adhesive layer 110, 111, in order to protect these adhesive layers.

As another option, the (two-sided) adhesive film 102 can be stored in step 215. Alternatively or in addition, the adhesive film 102 may also be delivered to the location where the label 100 is to be applied.

When the label 100 is to be applied in or on the vehicle 1, or shortly prior to that (a few days or weeks prior, but in any case considerably before the end of the shelf life of the adhesive film 102), the (two-sided) adhesive film 102 is stuck to the basic label form 101 in step 220. In that context, for example, an adhesive layer 111 is applied to the basic label form 101 and/or the adhesive film 102, and the two elements 101, 102 are stuck together. In the case of a two-sided adhesive film 102, the second adhesive layer 111 of the two-sided adhesive film 102 is stuck to the basic label form 101. For example, the second adhesive layer 111 of the two-sided adhesive film 102 is applied and stuck to the printed side of the substrate layer 130 of the basic label form 101. To that end, the optional protective film 115 can be removed from the second adhesive layer 111 of the two-sided adhesive film 102.

Figure 6:
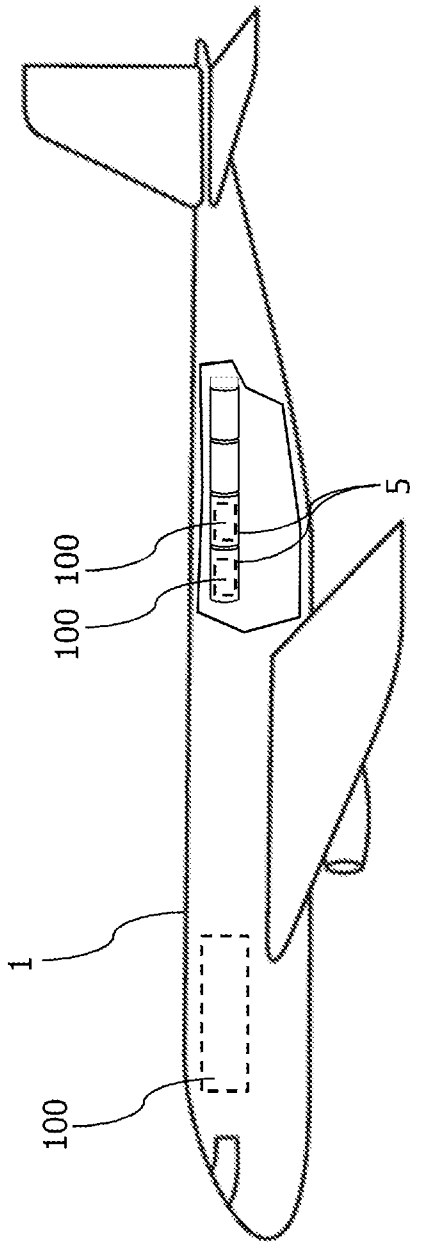
FIG. 6 shows, schematically, a vehicle with applied labels.

Then, in step 230, the label 100 is affixed in or on the vehicle 1. This is done by means of the first adhesive layer 110. For example, the optional protective layer 115 can be removed from the first adhesive layer 110 of the adhesive film 102, and the first adhesive layer 110 can be stuck to the surface of the vehicle 1 or to the surface of a vehicle element 5 (FIG. 6). This also takes place considerably before the end of the shelf life of the adhesive film 102.

FIG. 6 shows, schematically, a vehicle 1, here in the shape of an aircraft. A label 100 can, for example, be stuck to an outer skin of the aircraft 1. In that context, the first adhesive layer 110 of the (two-sided) adhesive film 102 can be manufactured with a special adhesive that is able to withstand the conditions on the outer skin of the aircraft 1. Moreover, the adhesive layers 110, 111, and at least one of the substrate layers 120, 130 of the adhesive film 102 or of the basic label form 101, may be transparent. Thus, the script on the outside of the aircraft 1 will consist solely of the pattern and/or text 150 of the printed basic label form 101.

As a purely exemplary option for affixing a label inside the vehicle 1, in FIG. 6 a part of the outer skin of the aircraft 1 is shown in cutaway, so that vehicle elements 5 (in this case, for example, overhead luggage compartments 5) are visible. At least one label 100 can, for example, be affixed to an overhead luggage compartment 5. In this context, the first adhesive layer 110 of the adhesive film 102 is optimized for the surface of the overhead luggage compartment 5.

Of course, the vehicle element 5 may equally be another object such as a partition, a passenger seat, a door, internal trim, a control panel, a handrail, a step, etc.

Finally, it is noted, in particular, that the variants, refinements and exemplary embodiments discussed above serve merely for describing the claimed teaching, but do not restrict this to these variants, refinements and exemplary embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for producing a label for affixing in or to a vehicle, the method comprising the following steps:

printing a first substrate layer with at least one of a pattern and text to yield a basic printed label form;

producing an adhesive film comprising:

a first adhesive layer;

a second substrate layer, the first adhesive layer having a first surface applied to the second substrate layer; and a protective film applied to a second surface of the first adhesive;

storing the basic printed label form prior to production of the adhesive film; and sticking the adhesive film to the basic printed label form using a second adhesive layer to produce the label, wherein the adhesive film and the second adhesive layer are located over the at least one of the pattern and text printed on the first substrate layer.

2. The method as claimed in claim 1, further comprising the step of:

sticking the label to the vehicle or to an element of the vehicle, using the first adhesive layer of the adhesive film.

3. The method as claimed in claim 1, wherein the second substrate layer of the adhesive film is opaque.

4. The method as claimed in claim 3, wherein the substrate layer of the adhesive film is white and non-transparent.

5. The method as claimed in claim 3, wherein the substrate layer of the adhesive film is at least partially colored or at least partially printed.

6. The method as claimed in claim 1, wherein at least one of the first adhesive layer or the second adhesive layer of the adhesive film is transparent.

7. The method as claimed in claim 1, wherein the first substrate layer of the basic printed label form is transparent.

8. The method as claimed in claim 1, wherein the printing includes an inkjet printing process.

* * * * *